| Station | | | | |
|---|---|---|---|---|
| STATION NO. 1 TRANSFER OF CARTRIDGE SYRINGE UNIT FROM HOPPER TO MACHINE | STATION NO. 2 FILLING OF CARTRIDGE SYRINGE UNIT | STATION NO. 3 INSERTION OF STOPPER | STATION NO. 4 UNLOADING |
| TRANSFER PLUNGER IN | HOLDING | HOLDING | HOLDING |
| HOLDING | VERTICAL POSITIONING OF CARTRIDGE HOLDER | | |
| | MAINTAINING VERTICAL POSITION OF CARTRIDGE HOLDER | | |
| HOLDING | INDEX TABLE LOADING PLUNGER DOWN | INDEX TABLE LOADING PLUNGER UP | HOLDING |
| | | | |
| PISTON RISES FOR PUMP RECHARGING | PISTON DESCENDS FOR DISCHARGE | | PISTON RISES FOR PUMP RECHARGING |
| HOLDING | FILLING NOZZLE DOWN | FILLING NOZZLE RISES AT FILLING RATE | HOLDING |
| HOLDING FOR STOPPER LOADING OF QUILL | LOADING QUILL DOWN FOR INSERTION OF STOPPER INTO CARTRIDGE | | LOADING QUILL UP |
| HOLDING FOR STOPPER LOADING | PLUNGER DOWN FOR INSERTION OF STOPPER INTO CARTRIDGE | HOLDING TO UNLOAD STOPPER | PLUNGER UP |
| HOLDING TO MAINTAIN CARTRIDGE IN INDEX TABLE | CARTRIDGE SUPPORT WITHDRAWN | HOLDING TO RECEIVE AND MAINTAIN CARTRIDGE IN INDEX TABLE | |

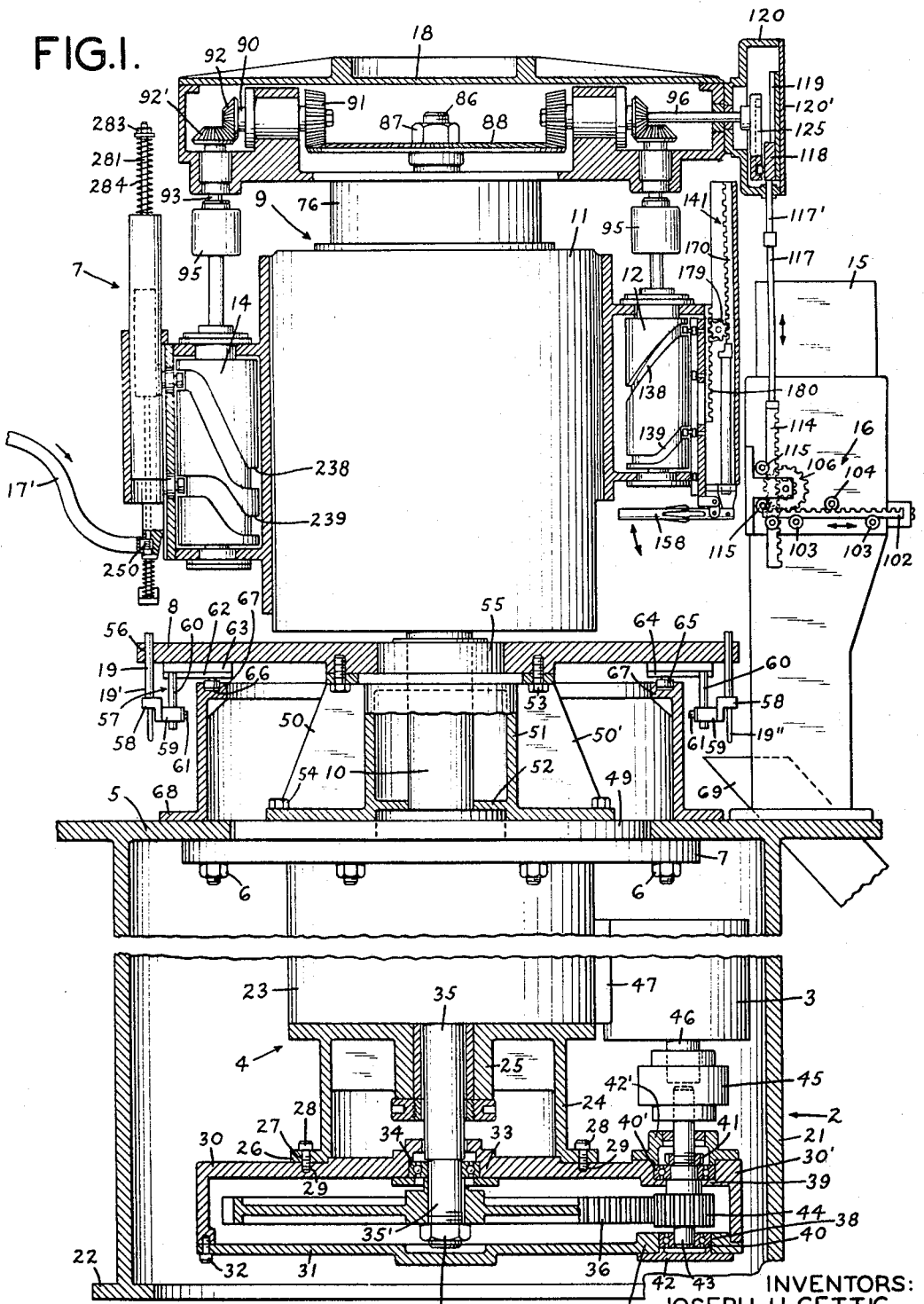

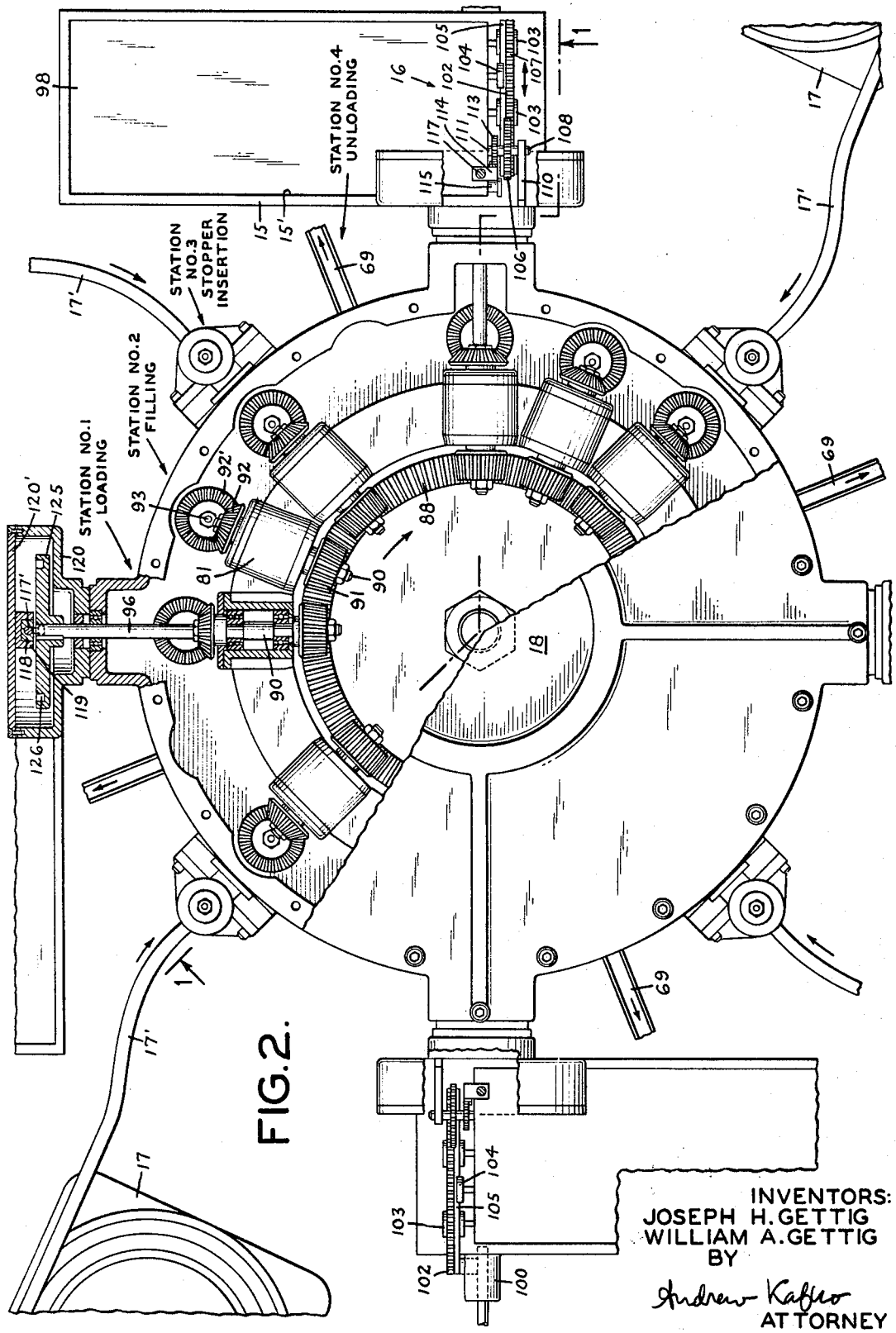

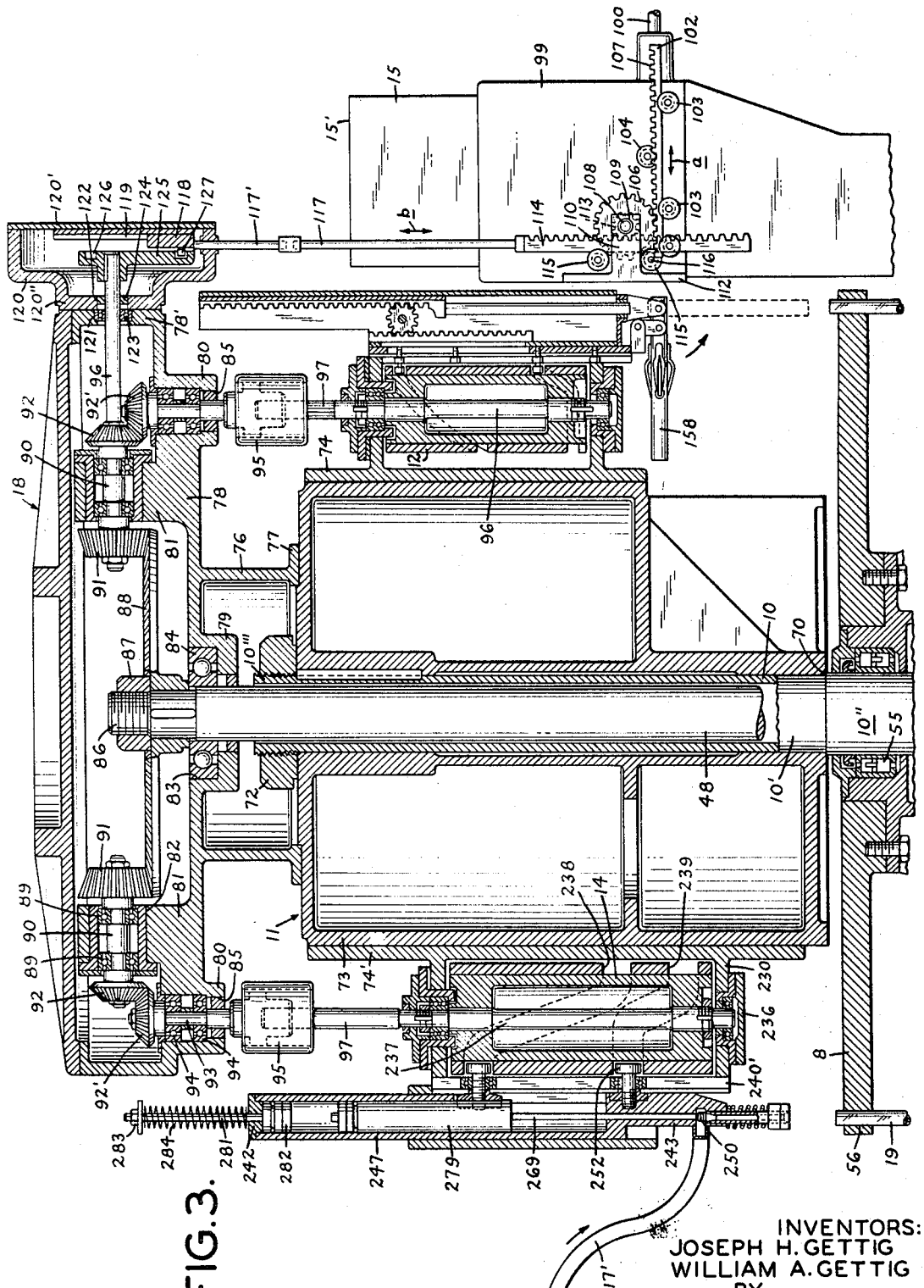

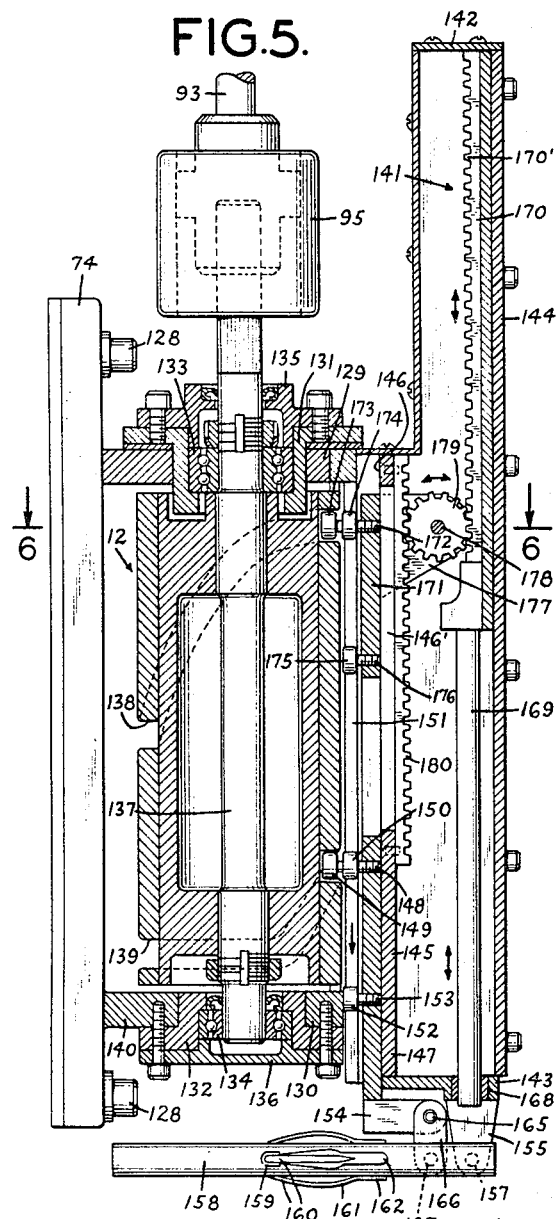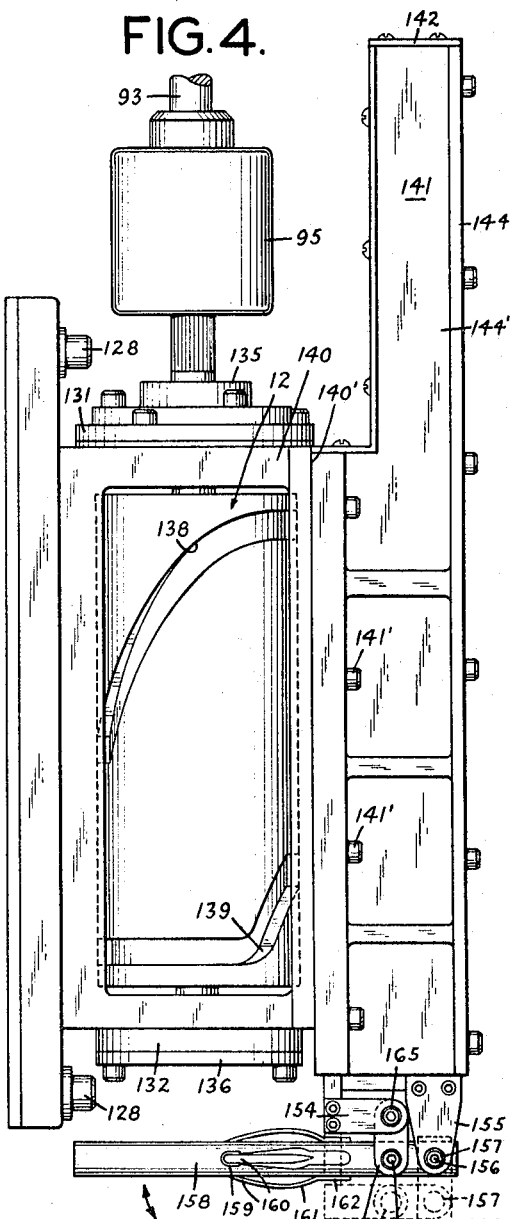

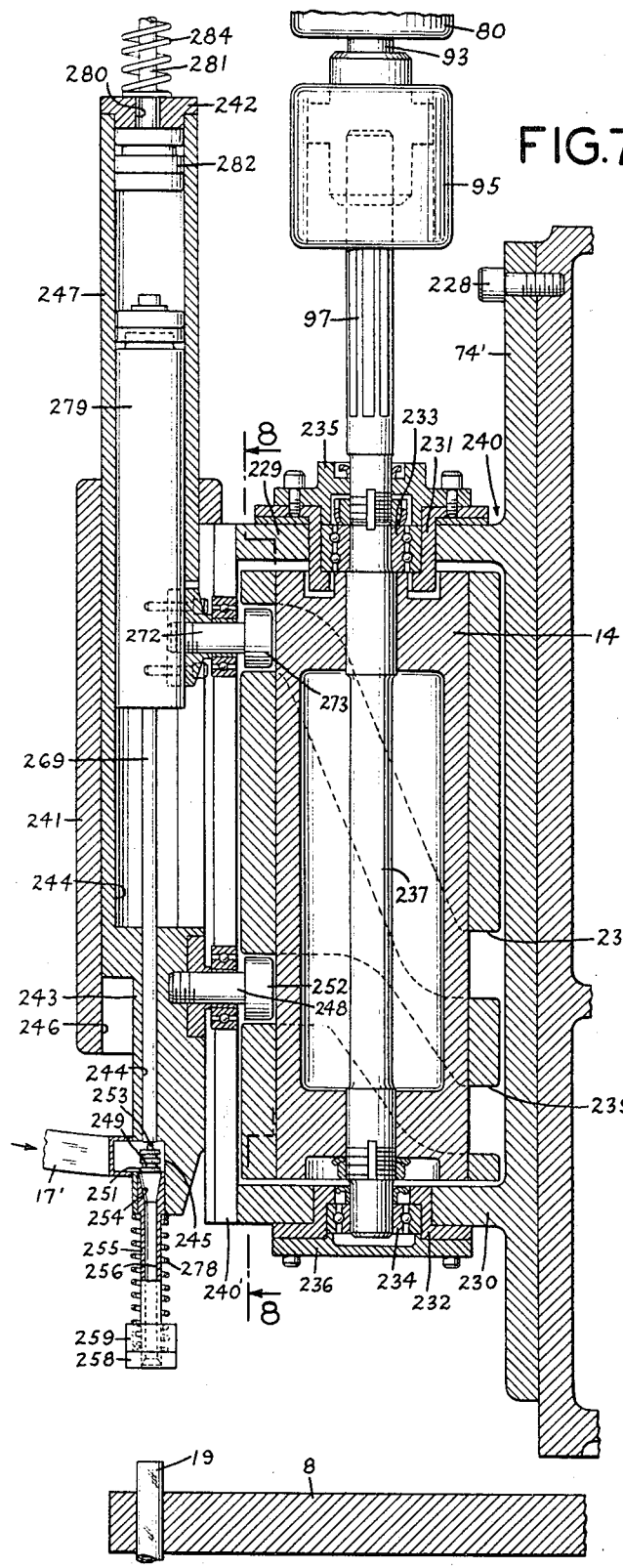

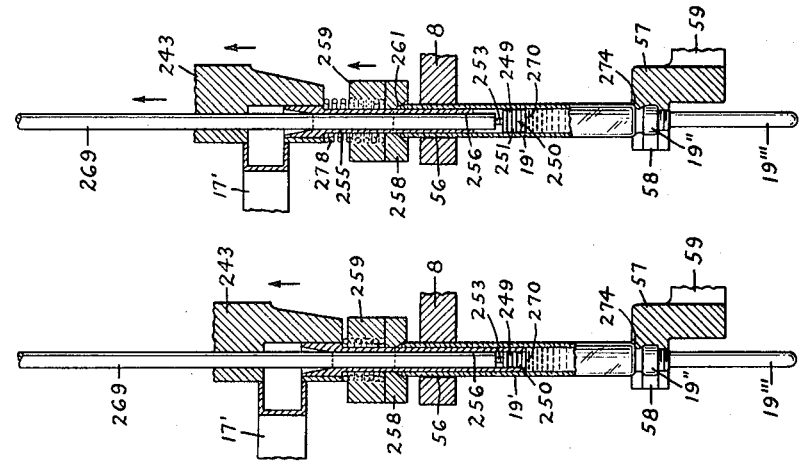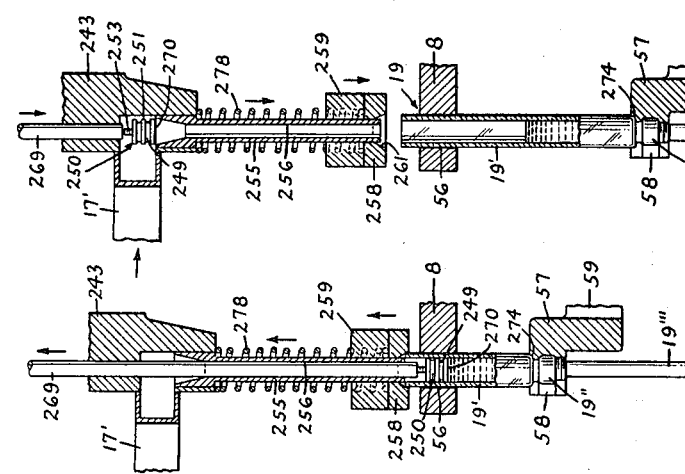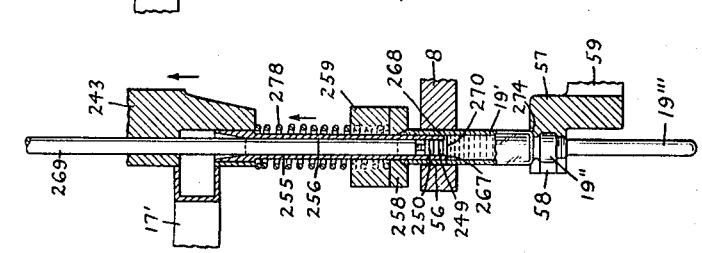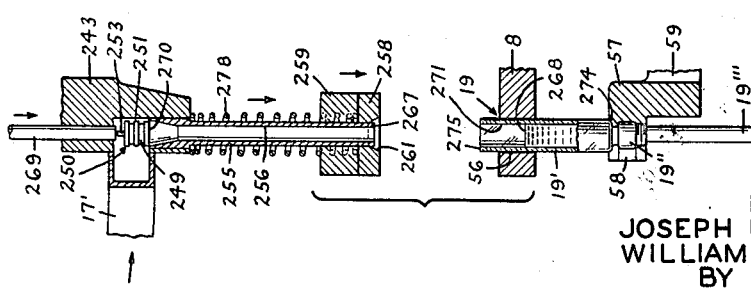

FIG. 11.

INVENTORS:
JOSEPH H. GETTIG
WILLIAM A. GETTIG
BY
Andrew Kaylor
ATTORNEY

United States Patent Office 3,391,518
Patented July 9, 1968

3,391,518
PROCESS AND APPARATUS FOR BREECH-FILLING CARTRIDGE SYRINGE UNITS
William A. Gettig, Millheim, and Joseph H. Gettig, Boalsburg, Pa., assignors to American Home Products Corporation, New York, N.Y., a corporation of Delaware
Filed Dec. 10, 1965, Ser. No. 513,136
10 Claims. (Cl. 53—43)

ABSTRACT OF THE DISCLOSURE

A process for introducing into a liquid-containing cartridge unit or ampule of a syringe, the reciprocable dispensing and aspirating resilient compressible plunger or stopper thereof, by reducing the diameter of said stopper, inserting it in such condition into the cartridge unit or ampule, while permitting the gaseous fluid medium therein, which would otherwise be entrapped, to escape via a space provided between the reduced diameter of the stopper and the inner surface of the cartridge, until the stopper is wholly within the cartridge at a point appreciably below the upper open end thereof, and the lower surface of stopper is at the liquid level in the cartridge and then, while maintaining the stopper in said position, permitting the stopper to expand in situ to abut the inner surface of the cartridge unit in fluid-sealing relationship therewith.

A specific apparatus for performing the process comprises hollow guide means having an external diameter less than the internal diameter of the cartridge unit or ampule to be stoppered, an inner diameter less than the external diameter of the resilient compressible stopper to be inserted, and ejection means for forcing a stopper which has been introduced into the guide means, toward the lower end thereof, and for maintaining the stopper in position just above the liquid level in the cartridge unit or ampule as the hollow guide means are withdrawn prior to withdrawal of the ejection means.

---

This invention relates generally to the production of hypodermic-needle cartridge-syringe units filled with a therapeutic drug or medicament. More particularly, the invention pertains to a process and apparatus for breech-filling hypodermic-needle cartridge-syringe units with liquid medicament and thereafter introducing into each of the liquid-containing cartridges thereof, the usual reciprocable dispensing and aspirating plunger to thereby form the final medicament-filled hypodermic-needle cartridge syringe assemblies usable in suitable syringes for parenteral administering of the drug.

Of the many kinds of hypodermic syringe assemblies obtainable commercially, those of the type referred to as "cartridge-syringe" units have become widely accepted and used by the medical profession. The cartridge-syringe unit generally comprises a transparent cartridge containing an injectable material, a hypodermic needle permanently affixed to one end of the cartridge, and, in the other end thereof, in fluid-tight relationship with the interior surface of the cartridge, a reciprocal plunger or stopper, to which is attachable a push rod, whereby the injectable material may be forced out of the cartridge and through the needle. The use of glass for the transparent cartridge has been conventional in most applications due primarily to its optimum transparency, susceptibility to cleaning and sterilization, and its inertness to the liquid medicaments contained in the cartridges. It has similarly been conventional that the hypodermic needle be stainless steel of a grade and composition which is impervious to known medicaments.

These known cartridge-syringe units comprising a glass ampule and a metal hypodermic needle have usually had these two elements affixed to each other by the crimping of a metal ferrule having the needle or cannula affixed thereto, to an end of the glass tube or ampule which is contoured or beaded for that purpose. However, prior to the final affixing of the ferrule (with needle attached) to said beaded open end of the glass tube, the plunger or stopper, which is conventionally of resilient and compressible material and has a normal diameter greater than the interior diameter of the tube to thereby provide the requisite fluid-tight sealing of the tube in all positions of the plunger therein, may be inserted into the tube via the opposite open end thereof. With this general mode of assembly, a comparatively simple procedure is available for filling the tube of the cartridge-syringe unit with medicament. Thus, the described mode of assembly permits filling of the tube via the beaded open end thereof, prior to closure of the tube with the needle-ferrule assembly, and after the tube is positioned substantially upright with the beaded open end uppermost, since the plunger then functions as the fluid-tight bottom closure for the tube. Thereafter, there are no unsolvable problems involved in positioning the needle-ferrule unit over the upper open beaded end of the filled tube and permanently affixing the unit to the tube by the aforementioned crimping operation. The needle is normally provided with the usual removable sheath conventionally of rubber, for the purpose of retaining the needle in aseptic condition and assuring that its sharp point is undamaged prior to use of the cartridge-syringe unit.

While the above method is the one in widest use for assembling these cartridge-syringe units, there are known drawbacks inherent in this mode of assembly. For example, the method requires very close control of the dimensions of the glass tube with respect to the contoured or beaded end to which the metal ferrule is to be crimped. This in itself is very costly. The method also requires the machining of the metal ferrules to micro-tolerances. This adds further to the cost of manufacture. Moreover, at assembly, the metal ferrules must be sealed with rubber gaskets, diaphragms, washers, or the like to render the units completely fluid-tight. Another drawback of the method is that slight variations in the piece to piece units, when handled in extremely large quantities, creates great inspection problems. As a result, failure to detect and eliminate off-size pieces results in a high percentage of breakage of the glass ampules, loss of ferrules, loss of cannulae, loss of medicaments, and loss due to work stoppage.

In our co-pending U.S. patent application Ser. No. 215,819, filed August 9, 1962, now Patent No. 3,247,850, there are described and claimed both a novel hypodermic-needle cartridge-syringe unit and a method of assembling such unit which effectively eliminate the recognized disadvantages of the mode of assembling cartridge-syringe units referred to immediately above. Generally, the novel cartridge-syringe assembly as described in said application, comprises a glass ampule, a metal hypodermic needle, and a substantially rigid plastic ferrule, wherein the ferrule is mounted at one end of the ampule and the hypodermic needle is mounted in the ferrule and in communication with the interior of the ampule, and a set adhesive permanently retains the ampule, the metal hypodermic needle, and the plastic ferrule in the stated relationship.

It will appear at once that the conventional method of first stoppering, then filling the ampule of the prior art cartridge-syringe unit structures, and thereafter affixing the hypodermic needle and ferrule sub-assembly thereto, is not applicable to cartridge-syringe units of the type described in our aforesaid co-pending application and with which we are presently concerned. The reason for the inapplicability is based in the fact that the assemblage of the ampule, hypodermic needle and plastic ferrule requires the application of an adhesive which must then become set to provide the required permanent retention of the parts. Because of this, new problems arise with respect to the necessary application of a flowable adhesive over the surfaces of the parts to be joined, while assuring that the adhesive does not contaminate the liquid medicament already in the tube or ampule. There is an increased problem when the adhesive is of the thermosettable type due to the necessary application of heat, since high temperature heating, particularly when prolonged, is injurious to most liquid medicaments.

The obvious attempt of a solution to the above problem would appear to reside in merely filling the ampule from the other end, i.e., by "breech-filling," after the attachment of the tube with the sheath-provided needle-ferrule unit by means of the adhesive has been completed. Unfortunately, this raises a more serious problem, since it has not been possible heretofore to insert the stopper or plunger in proper fluid-tight relationship within a tube or ampule and adjacent the upper level of the liquid medicament therein, because of the trapping of a column of air between said liquid level and the stopper as soon as the latter is in fluid-tight relationship with the internal surfaces of the tube upon insertion of the stopper therein.

In consideration of the foregoing, it is a primary object of the present invention to provide a process and apparatus for breech-filling and thereafter stoppering preassembled hypodermic-needle cartridge-syringe units of the type described, by a highly efficient and substantially fully automatic operation.

Another object of the invention is to provide a process and apparatus for processing said cartridge-syringe units that employ a series of operations as the units are transported from the location at which they are loaded to the machine through the final discharge of the medicament-filled and properly stoppered cartridge-syringe units.

Another object of the invention is to provide an apparatus of the type described wherein the requisite operations are performed at separate stations located over a single rotatable index table.

It is another object of the invention wherein the operations are separated and sequentially performed at a loading station, a filling station, a stopper-inserting station, and an unloading station through which the index table rotates.

Still another object is to provide common driving means for operating the mechanisms of the loading station, the filling station, the stopper-inserting station, and the unloading station, as well as rotation of the index table, in a synchronous manner.

Another object is to provide an apparatus of the type referred to above wherein the arrangement of the structure performing all of the aforesaid functions permits them to be done in a highly efficient manner and yet occupies a minimum amount of space.

Yet another object is to provide a machine with a plurality of banks of stations all functioning simultaneously with respect to the same rotatable index table.

Still another object is to provide, for use in such apparatus of the type referred to herein, a loading station for feeding the hypodermic-needle cartridge-syringe units horizontally, one at a time, to the machine and inserting the units vertically onto the index table with the hypodermic-needles of said units disposed downwardly and hence, the open end of the ampulse disposed upwardly.

Another object is to provide a filling station for injecting liquid-medicament in predetermined amounts to each cartridge-syringe units carried in vertically-disposed relationship on the index table.

Another object of the invention is to provide for such apparatus, a stopper-inserting station for placing a resilient and compressible stopper or plunger in each medicament-filled cartridge-syringe unit and adjacent the upper surface of the medicament in said tube, without entrapment of air.

A further object of the invention is to provide an unloading station for the apparatus which removes the medicament-filled and stoppered cartridge-syringe units from the index table.

The above, and other objects and advantages of the invention will appear from the description thereof which follows.

*General description of the invention*

In its most comprehensive aspects, our invention relating to the breech-filling and plunger-stoppering of hypodermic-needle cartridge-syringe units, resides in the provision of a machine which comprises: a horizontally disposed rotatable index table, means for rotating the table intermittently, the table having means providing a plurality of vertically disposed receptacles mounted in circular array with each receptacle adapted to receive a single hypodermic-needle cartridge unit at a time with the needle thereof disposed downwardly; a loading station positioned at the table, the loading station comprising means for sequentially inserting a hypodermic-needle cartridge unit with the needle thereof downwardly disposed into one of the receptacles of the table after the table is rotated to position a given receptacle in operative relationship with the inserting means; a filling station positioned at the table, the filling station comprising means for sequentially filling, with a medicament, the units positioned in the receptacles of the table by the loading means, after the table rotates to position a given receptacle in operative relationship with the filling station; a stopper-inserting station positioned at the table, the stopper-inserting station comprising means for sequentially inserting a stopper into the medicament-filled units in the receptacles of the table; and an unloading station positioned at the table, with the unloading station comprising means for sequentially removing medicament-filled and stoppered hypodermic-needle cartridge units from the receptacles of the table.

Preferably, the loading station comprises a hopper adapted to contain a plurality of hypodermic-needle cartridge units stacked horizontally with the needle ends thereof oriented in the same direction, and means for ejecting horizontally from the hopper a single cartridge unit at a time; a horizontally disposed rotatable index table, means for rotating the table in an intermittent manner, the table having means providing a plurality of vertically disposed receptacles mounted in circular array with each receptacle adapted to receive and retain a single hypodermic-needle cartridge unit at a time with the needle thereof disposed downwardly; a cartridge unit holder, means mounting the cartridge unit holder for movement from a horizontal position in alinement with the horizontal ejection means associated with the hopper for receiving a hypodermic-needle cartridge unit therefrom, to a vertical position in alignment with one of the receptacles of the index table; and means for ejecting a hypodermic-needle cartridge unit from the cartridge unit holder and into one of the receptacles with which it is alined, when the cartridge unit holder is in vertical position.

In accordance with a broad aspect of the stopper-filling feature of the invention, the method of inserting a stopper in the unit comprises positioning an open-topped cartridge unit containing a liquid, in vertical disposition, providing a resilient compressible stopper having a diameter normally adapted to fit snugly within the unit, compressing the stopper radially to a diameter that is less than the internal diameter of the unit, inserting the compressed stopper downwardly into the open top of the unit, while permitting ambient fluid in the unit above the level of the liquid therein to move upwardly, continuing the downward insertion of the compressed stopper and permitting of upward movement of fluid in the unit above the liquid level therein until the stopper is positioned closely adjacent the liquid level in the unit, then permitting the so-positioned radially compressed stopper to expand toward its normal diameter, whereby the stopper fits snugly within the unit closely adjacent the liquid level in the unit.

In a preferred embodiment of a device for performing the above method automatically, the device comprises a generally cylindrical vertically disposed hollow guide means having at a lower open end thereof an internal diameter less than the external diameter of the resilient compressible stoppers to be inserted and an external diameter less than the internal diameter of the cartridge unit to be stoppered, means for introducing one resilient compressible stopper at a time into the guide means, means for forcing a resilient compressible stopper, which has been introduced into the guide means by the introducing means, out of the lower open end of the guide means, means for positioning a cartridge unit containing liquid therein, beneath the vertically disposed guide means and in axial alinement therewith, whereby the open ends of the guide means and the cartridge unit positioned therebeneath respectively are opposed to each other, means for causing relative axial movement of the guide means and the cartridge unit positioning means towards each other after they have been alined, whereby the guide means enters the open end of the cartridge until the open end of the guide means is closely adjacent the level of liquid in the cartridge unit, means for causing relative axial movement of the guide means and cartridge unit positioning means away from each other, and means synchronously actuated when the last named means are operative for actuating the means for forcing a resilient compressible stopper out of the lower end of the guide means, whereby the stopper is left in the cartridge unit just above the level of liquid therein.

A better understanding of the features of the invention referred to above, and of various other correlative features, will be had from the description of a specific embodiment of the invention described below. As will be understood, said specific embodiment is intended to be illustrative only and not to limit the scope of the invention as defined in the appended claims.

In the description that follows, reference is made to the drawings wherein:

FIG. 1 is a side elevation of a machine embodying the invention, various parts thereof being in vertical section taken along line 1—1 of FIG. 2;

FIG. 2 is a top plan view of the machine of FIG. 1 with parts of the top plate shown broken away to expose the internal gear structure;

FIG. 3 is a vertical cross-sectional view of the upper portion of the machine of FIG. 1, shown on a larger scale;

FIG. 4 is a still larger scale side elevation of the structure of the loading station shown in FIG. 1, exclusive of the associated hopper and feeding mechanism;

FIG. 5 is a view similar to that of FIG. 4, but with certain parts in vertical section;

FIG. 6 is a horizontal sectional view of the structure shown in FIGS. 4 and 5, the section being taken on line 6—6 of the latter figure;

FIG. 7 is an enlarged vertical cross-section of the stopper-inserting station shown in smaller scale in FIGS. 1 and 3;

FIG. 8 is a vertical cross-section of the stopper-inserting station shown in FIG. 7, the section being taken along lines 8—8 of the latter figure;

FIGS. 9A, 9B and 9C are similar vertical cross-sections of the stopper-inserting structure and movable support therefor at the stopper-inserting station shown in FIGS. 1 and 3, with the said structure and support here disclosed on an enlarged scale and in varying relationship to the hypodermic-needle cartridge-syringe unit carried in a receptacle of the index table as follows:

In FIG. 9A, the parts are shown at the time the stopper-inserting structure has just been loaded with a stopper and is about to be lowered toward the medicament-filled tube of the cartridge-syringe unit supported in a receptacle in the index table;

In FIG. 9B, the relationship of parts is shown at the time the stopper has been positioned in the bottom of the stopper-inserting structure by the pusher rod thereof and the pusher rod and stopper-inserting structure with stopper therein has been lowered into the tube of the cartridge so that the bottom surface of the stopper is positioned at the upper liquid level of the medicament in the tube, and with the stopper-inserting structure and support therefor in the position preparatory to withdrawal of the structure from the tube; and In FIG. 9C, the relationship of parts is shown just prior to lift-off of the pusher rod from abutment with the stopper screw and lift-off of the position collar of the stopper-inserting structure from the upper edge of the tube of the cartridge-syringe unit, and just after the stopper-inserting structure has been lifted to permit expansion of the stopper in the desired position in the tube above the liquid level therein;

FIGS. 10A, 10B and 10C are vertical cross-sectional views of the stopper-inserting structure and support structure, respectively, similar to FIGS. 9A, 9B, and 9C, but in the present case, showing the relationship of parts when the stopper-inserting structure and support therefor is adjusted to accommodate longer cartridge-syringe units in which the stoppers are to be positioned at a higher liquid level in the tubes of the units and, at the same time, at a point appreciably below the upper open end of such tubes; and FIG. 11 is a chart showing the relative positioning of various structures at each of the four stations, indicated during a full 360° rotational cycle of the cam rollers at the first three stations, and the relative positioning of the camming structure of the fourth station during such cycle.

General arrangement of the apparatus

As appears of FIG. 1, the general arrangement of the embodiment 1 of the invention described herein comprises a base section 2 which functions to house the assembly of the prime mover 3 and driving mechanism 4 suspended from the underside of the upper horizontal wall 5 of section 2 by bolts 6 extending through a top wall 7 of driving mechanism 4. Base section 2 also functions to support a rotary index table 8 by means desscribed hereinafter, as well as the entire superstructure 9 via a stationary hollow pedestal 10. This superstructure 9, in turn, comprises a main mounting structure 11 for the camming cylinders 12, 13 and 14 and the related structures (FIG. 2) of the Loading Stations (No. 1), the Filling Stations (No. 2) and the Stopper Inserting Stations (No. 3) as also described in detail hereinafter. Supported atop the main mounting structure 11 is an overhead gear box 18.

Operatively associated with each loading Station (No. 1) is a hopper 15, which is adapted to contain a plurality of empty, sterile hypodermic-needle cartiridge-syringe units 19, and is equipped with cartridge-syringe unit delivery means 16, each of which structures are also described in detail hereinafter. Similarly, operatively associated with each Stopper-Insertion Station (No. 3) is a hopper 17, which is adapted to contain a plurality of resiliently compressible stoppers 250, and is equipped with delivery means 17'.

The base section housing and the driving mechanism therein

Base section 2 comprises a circumferential main supporting wall 21, a lower peripheral supporting foot 22 and the main supporting upper horizontal wall 5, which, as referred to previously, has suspended from its underside by the bolts 6 through its top wall 7, the prime mover 3 and driving mechanism assembly 4.

Driving mechanism 4 comprises a reduction gearing and intermittent drive box 23, having a structure of conventional design which comprises no part of the present invention. Drive box 23 is provided with a skirt 24 and a bearing hub 25 also of conventional design. The lower end of skirt 24 has an out-turned annular ledge 26 having a plurality of apertures 27 therethrough. Through each of apertures 27 extends a screw 28, the lower threaded ends of which are engaged in respective female-threaded apertures 29 in a gear housing plate 30 of inverted generally dish-shaped configuration. Gear housing plate 30 extends eccentrically at its right edge 30' as viewed in FIG. 1, for a purpose that will appear hereinafter. A gear housing closure plate 31 is attached to the lower periphery of gear housing plate 30 by means of a plurality of screws 32, only one of which appears in FIG. 1. As also appears in FIG. 1, closure plate 31 extends eccentrically to the right at 31' precisely in the manner as does gear housing plate 30 to mate therewith.

Gear housing plate 30 is provided with a centrally located bearing hub 33, which is in axial alignment with bearing hub 25 of drive box 23 and is provided with a conventional bearing race 34. Extending downwardly from the interior of drive box 23 and through hubs 25 and 33 and into the gear housing enclosed by plates 30 and 31, is a shaft 35. The latter has affixed to the lower end 35' thereof, for rotation therewith, a large gear 36, by means of a nut 37.

In the region defined by the eccentric extension of complementary gear housing plate 30 and 31, said plates are respectively provided with bearing hubs 38 and 39 having respective conventional races 40 and 40', a lock nut 41, and respective bearing closure plates 42 and 42' for maintaining a drive shaft 43 in rotative disposition. Shaft 43 has affixedly attached thereto, for rotation therewith, a pinion 44 which as maintained in meshing relationship with large gear 36. Shaft 43 is connected by means of coupling 45 to the drive shaft 46 of prime mover 3 which is supported on drive box 23 by means of bracket 47.

Supported by, and extending upwardly from, drive box 23 is said stationary hollow pedestal 10, which, as appears in FIG. 3, has extending therethrough a rotatable main drive shaft 48. The latter is also supported by drive box 23 in bearing means therein (not visible) and is drivingly connected via gears (not shown) in box 23, shaft 35, gear 36, pinion 44, and coupled shafts 43 and 46, to prime mover 3. Mounted on box 23 is a rotatable supporting platform 49, drivingly connected by means (not visible) to the intermittent reduction drive mechanism housed in box 23.

*The intermittently rotatable index table*

Supported by and affixed by screws 54 to intermittently rotatable platform 49, for rotation therewith, is an index table support 50 comprising a plurality of radially extending webs 50' and having an outer configuration of a generally truncated cone. Index table support 50 has an interior strengthening cylinder 51 integral therewith, the interior diametrical webs 52 of which ride on the exterior surface of stationary hollow pedestal 10. Index table 8, is attached to support 50 by screws 53 and is provided centrally with a hub and bearing assembly 55 (FIG. 3) to permit rotation of table 8 on pedestal 10.

Index table 8 is provided around its periphery with a plurality of equi-spaced apertures 56, each of a diameter dimensioned to receive therein the barrel 19' of a cartridge-syringe unit 19 in upright position. Each aperture 56 has associated therewith and therebelow, a laterally movable retaining bracket 57. Each retaining bracket 57 comprises a bifurcated stop member 58 (FIGS. 1, 9A–9C, and 10A–10C) the slot of which is of a configuration to removably retain the hub 19" of the unit 19, in a respective aperture 56. Each bifurcated stop member 58 has a lateral extension 59 thereof, by which it is adjustably mounted on a vertically disposed rod 60, by a set screw 61. Each rod 60 is fixedly attached to and suspended from one end of a horizontally slidable bar 62 reciprocally mounted in a guide member 63, which is in the form of a generally inverted U-shaped channel with the arms 64 turned inwardly to retain bar 62 in member 63. Affixed to the other end of bar 62 is a cam roller wheel 65 which rides in a cam roller guideway channel 66 provided in the top periphery of an annular wall 67, which is mounted on and affixed to top wall 5 by a circumferential flange or foot 68. Channel 66 is of sinuous configuration to cause inward movement of a given cam roller wheel 65 (towards the center of table 8) only when an associated aperture 56 with its respective retaining bracket 57 has moved to a position directly over a chute 69, which, as indicated in FIG. 2 is located at each Unloading Station (No. 4). When each aperture 56 moves to a position directly over a chute 69, the inwardly curved channel 66 guides the cam roller wheel 65 of the retaining bracket 57 associated with the given aperture 56 inwardly and with it the reciprocally slidable bar 62 on which a bifurcated stop member is carried, thereby to release the cartridge unit 19 from the aperture 56 and into the chute 69 therebelow.

*The general superstructure*

As seen in FIG. 3, the stationary pedestal 10 is of a reduced diameter at its entire upper portion thereby to form a supporting ledge 70 which the reduced diameter 10' and larger diameter 10" of pedestal 10 meet. Telescoped on pedestal 10 and resting with its bottom edge 71 on ledge 70 is the main mounting structure 11. Main mounting structure 11 is clamped on the ledge 70 of stationary pedestal 10 by means of a large nut 72 screwed on the threaded top end 10''' of pedestal 10 to assure a non-rotative relationship of structure 11 on pedestal 10. Supported on a circumferential wall 73 of main mounting structure 11 are bracket members 74 and 76 in each of which is respectively disposed, in vertical disposition, a separate camming cylinder 12 and 14, each of which is described individually hereinafter in the descriptions of the specific station with which each camming cylinder is operatively associated. A third bracket member and camming cylinder thereon, located at each Filling Station (No. 2) also referred to hereinafter, is not visible in FIG. 1 of the drawings.

Overhead gear box 18 comprises an upwardly facing generally dish-shaped plate 78 which is supported atop main mounting structure 11 by a depending cylindrical web 76 affixed to the top wall of main mounting structure 11 by a peripheral foot 77. Dish-shaped plate 78 is provided with a central bearing hub 79 having a vertically disposed aperture 83 therethrough and a plurality of peripheral bearing hubs 80, one for each of Stations No. 1, 2 and 3, and each having a vertically disposed aperture 85 therethrough. Circularly arranged in plate 78 inwardly of the peripheral bearing hubs 80 are a plurality of upwardly disposed bearing hubs 81, each having a lateral aperture 82 therethrough with the axis thereof intersecting that of a respective peripheral bearing hub 80.

Upper end of shaft 48 extends through a hub 79 and a bearing race 84 mounted therein, and terminates in a screw-threaded end 86. Clamped to the upper end of shaft 48, by a nut 87, is a bevel gear 88. Each of the hubs 81 is provided with a pair of bearing races 89, in each pair of which is rotatably mounted a horizontally disposed shaft 90. Each shaft 90 is maintained against axial displacement in its bearing races 89 by a larger pinion 91 affixed to the inner end of the respective shaft 90 and a smaller outer pinion 92 affixed to the outer end of said shaft 90. Each of said larger pinions 91 is thus positioned in meshing engagement with bevel gear 88, while each of said small outer pinions 92 is positioned in meshing engagement with a corresponding pinion 92' each mounted on a vertical shaft 93 which extends through a respective pair of bearing races 94 in each of said hubs 80. The lower ends of vertical shafts 93 each have mounted thereon for rotation therewith, a respective coupling 95 by which each said vertical shaft 93 is drivingly joined to the shaft 97 on which a respective cam cylinder 12, 13 and 14 is mounted. These cam cylinders 12, 13 and 14 will be referred to in greater detail in the descriptions hereinafter of the respective Stations (Nos. 1, 2 and 3) with which each cylinder is operatively associated.

Each horizontal shaft 90, which is associated with the drive shaft 97 for the camming cylinder 12 of Loading Station (No. 1), is provided with an axial extension 96 for a purpose which appear in the description of said Loading Station (No. 1) now given below:

The Loading Station No. 1

Loading Station (No. 1) comprises a hopper 15 adapted to be loaded via its open top 15' with a plurality of cartridge-syringe units 19 in horizontal disposition, each with the cannula-covered needle end 19''' directed generally toward the main axis of the entire apparatus, as viewed in FIGS. 2 and 3. The lower wall 98 of hopper 15 is inclined downwardly, from top to bottom, as viewed in FIG. 2, whereby the cartridge-syringe units 19 tend to gravitate toward the said bottom end of the interior of hopper 15, the exterior of which end is defined by wall 99 shown in elevation in FIG. 3. At the lowermost point inside hopper 15 there is provided an ejection piston 100, which is capable of pushing one cartridge unit 19 at a time axially of itself in the direction to the main axis of the apparatus, as viewed in FIGS. 2 and 3.

Piston 100 is coupled by a link 101 to a rack 102 which is mounted for lateral reciprocal movement, in the direction of the double-headed arrow *a*, by means of flanged rollers 103 on which the lower edge of rack bar 102 rides, an upper guide roller 104 which engages a smooth ledge 105 provided on rack bar 102 (FIG. 2), and a pinion gear 106, which meshes with the teeth 107 of rack bar 102. Pinion gear 106 is affixed to a shaft 108 mounted, on one end thereof, in a bearing aperture 109 provided in a bracket member 110, and at the other end, in a bearing aperture 111 in vertical end wall 99 of hopper 15. Bracket member 110 is affixed to wall 99 of hopper 15 at 112. Also affixed to shaft 108 for rotation therewith, is a smaller pinion 113. Pinion 113 in turn is in engagement with a second rack bar 114, which, in this case, is mounted for vertical reciprocation, in the direction of double-headed arrow *b*, on flanged rollers 115 rotatably mounted on shafts 116 extending from vertical end wall 99 of hopper 15. The upper end of this second rack bar 114 has mounted thereon, as an extension thereof, a piston rod 117 which is coupled to a further extension piston rod 117'. The upper end of second piston rod 117', in turn, is connected for vertical movement therewith, to a slideable bar 118 maintained in a vertically disposed guide channel 119 of U-shaped cross-section (FIG. 2) and affixed to a circular plate 120' which is mounted on and forms the closure for a generally bell-shaped housing member 120.

Housing member 120 is affixed at its apical end wall 120'' to the circumferential wall 78' of dish-shaped plate 78 of gear box 18. Axially aligned apertures 121 and 122 are respectively provided in circumferential wall 78' and apical end wall 120'' of housing member 120 and have respectively mounted therein bearing members 123 and 124, through which, as best seen in FIG. 3, lateral extension 96 extends. Keyed to the end of lateral extension 96 within the space defined by housing member 120 and plate 120', is an eccentric wheel 125 provided on its distal surface with a peripherally disposed camming guideway 126. Affixed to the exposed surface of slidable bar 117 is a camming wheel 127, which, as also seen in FIG. 3, rides in guideway 126 of eccentric wheel 125. As will appear from the structure described, rotation of lateral shaft extension 96 and with it eccentric wheel 125, results in vertical reciprocation of bar 118 in guide channel 119, and, therewith, via piston rods 117 and 117', the vertical rack bar 114. Reciprocation of vertical rack 114 causes rotation of pinion 113 in one direction and then the other, and with it, larger pinion 106, whereby horizontal rack bar 102 is periodically reciprocated and with it ejection piston 100, thereby to eject a single cartridge unit 19 for each full rotation of eccentric wheel 125.

Intergral with a bracket member 74', which is mounted on main support 11 by means of screws 128, is a cylinder housing 140 comprising a pair of laterally extending bearing plate mounts 129 and 130, respectively provided with bearing hubs 131 and 132 in which are respectively retained bearing raceways 133 and 134 by means of closure plates 135 and 136. Extending through said raceways 133 and 134 are the ends of a shaft 137 to which is keyed the camming cylinder 12. The upper end of shaft 137 is coupled to shaft 93 by means of coupling 95, as referred to hereinbefore. Camming cylinder 12 is provided with a pair of separately circumscribing channels 138 and 139 defining differing pathways for a purpose which will now appear.

Mounted on vertical wall 140' of cylinder housing 140, distally of the camming cylinder 12, by means of screws 141', is a rack housing 141 comprising a top plate 142, a bottom plate 143, side plate members 144 and 144', and a proximal wall 145 abutting wall 140' of housing 140. The proximal wall 145 of housing 141 is provided with a vertical channel 146, 146' of generally squat T-shaped horizontal cross-sections, as appears in FIG. 6. Mounted in the lowermost region of wider channel 146 which extends downwardly to open out through bottom plate 143, is a reciprocable plate 147 of rectangular configuration having affixed to the upper end thereof a shaft 148 on which is mounted a pair of rollers 149, 150 which extend through a narrow vertical channel 151 in the distal vertical wall 140' of housing 140. Outer roller 149 is positioned to ride in lowermost camming channel 139 of camming cylinder 12. Inner roller 150 rides in narrower vertical channel 151 which functions as a guideway in which a third roller 152, mounted on a shaft 153 affixed in the lower end of reciprocable plate 147, also rides to guide vertical reciprocation of said plate 147, as roller 149 moves vertically in response to the camming function of channel 139 as camming cylinder 12 is caused to rotate by shaft 137.

Affixed to the lowermost end of plate 147 is a bifurcated horizontal extension 154. Affixed to bottom plate 143, adjacent to extension 154, there is a depending bifurcated extension comprising bearing lugs 155. Depending lugs 155 have at their lowermost ends a pivot bearing 156 in which is mounted a pivot pin 157 attached to a hollow open-ended cylindrical cartridge holder 158. The latter has in its medial region four apertures 159 into each of which extends the cartridge engaging finger 160 of a resilient clamping member 161 affixed at its other end 162 to the exterior surface of cartridge holder 158. The internal diameter of cartridge holder 158 is selecetd to accommodate the external diameter of the cartridge syringe units 19 to be handled by the apparatus 1.

The arrangement of the foregoing parts is such that, in the horizontal position of cartridge holder 158, as shown in FIGS. 4 and 5, said holder is axially aligned with the delivery means 16 of the hopper 15, as appears in FIG. 1. For moving hollow cartridge holder 158 to said horizontal position (and cyclically to the vertical position referred to hereinafter); the distal end of bifurcated horizontal extension 154 is provided with a pivot pin 165 on which is pivotally mounted, by an end thereof, a link 166. Link 166 has its other end pivotally attached by a pin 167 to the side surface of holder 158. As shown in phantom lines in FIG. 4, when channel 138 of rotating camming cylinder 12 causes roller 149 to descend to its lowermost position; the described linkage system between the vertically reciprocal bar 147 and cartridge holder 158 causes the latter to assume its vertical position.

In the bottom closure plate 143 there is provided, axially of cartridge holder 158, when the latter is in its vertical position, an apertured hub 168. Mounted for vertical reciprocation through said hub 168, is an index table loading plunger 169, which on its upper end, is fixedly mounted on a vertically reciprocal rack 120, for movement therewith. Mounted in the upper portion of vertical channel 146 is a second reciprocal plate 171 which also at its upper end is provided with a shaft 172 on which are mounted a pair of axially aligned rollers 173, 174, the distal of which, in this instance is positioned in the upper camming channel 138 of cylinder 12, and the proximal of which is similarly confined in narrower vertical channel, as is a lowermost roller 175 similarly mounted on another shaft 176 affixed to plate 171. Plate 171 has a pair of lateral extensions 177 which function as bearing mountings for a shaft 178 on which is rotatably mounted a pinion 179. Pinion 179 is maintained in meshing engagement with the teeth 170 of vertically reciprocable rack 170. Affixed to the interior surface of wall 145 is a second rack 180 of narrower width than channel 146' to permit free vertical movement therebeside of lateral extensions 177. As appears in FIGS. 5 and 6, pinion 179 mounted on extensions 177 is in meshing engagement with rack 180.

As appears from the relationship of parts just described, upon vertical reciprocation of plate 171 downwardly as roller 173 is urged in such direction by channel 138, of cylinder 12, pinion 179 is caused to ride downwardly on fixed rack 180 and hence to rotate clockwise as viewed in FIG. 5. Such rotation causes downward vertical reciprocation of movable rack 170 and with it loading plunger 169.

The relationship of the camming guideway 126 of eccentric 125 which actuates the feeding mechanism of hopper 15 and the two channels 138 and 139 in cylinder 12 are preferably selected that, upon rotation of said eccentric 125 and cylinder 12 by the common driving means, e.g. lateral shaft 90 with extension 96; the transfer plunger 100 of hopper 15, the positioning of the cartridge holder 158 with respect to the vertical and horizontal positions thereof, and the reciprocation of index table loading plunger 169, all go through related cycles, as indicated in the schematic representation in FIG. 11, in the section thereof identified as "Station No. 1 Transfer of Cartridge Syringe Unit from Hopper to Machine."

*The Filling Station No. 2*

Filling Station No. 2 comprises structure generally similar to that of Station No. 1, insofar as the driving mechanism therefor and camming cylinder thereof are concerned. Thus, as appears in FIG. 2, there is a shaft 90 mounted in a bearing within a hub 81 and having at one end thereof a pinion 91 meshing with bevel gear 88 and a second pinion 92 in driving engagement with a pinion 92' fixedly mounted on a shaft 93 for rotation therewith. Shaft 93 is connected, via a coupling (not visible in the drawings) similar to the coupling 95 of Station No. 1, to a shaft on which is mounted a camming cylinder (neither of which structure is visible) of substantially similar structure to that of shaft 97 and camming cylinder 12, and supported on the main mounting structure 11 by means of a screw-fastened bracket similar to bracket 74.

The camming cylinder for the filling assembly is similarly provided with two camming channels generally similar to channels 138 and 139 of cylinder 12. One of said camming channels functions to control raising and lowering of a camming roller and, therewith, a supporting structure for a filling nozzle. The other of said channels functions to control reciprocation of a liquid injection piston of a pump connected to a reservoir or medicament, as will be understood by those skilled in the art.

The relationship of the camming channels is selected to be such that the filling nozzle is lowered by said one of the camming channels into the open top end of cartridge unit 19 positioned in a receptacle 56 in index table 8, and, only thereafter, is the piston of the pump actuated by the other camming channel to eject medicament, with the filling nozzle being lifted gradually as the cartridge 19 is being filled. The camming channels are further contoured so that, ultimately, the piston actuation is arrested and reversed to permit repriming of the pump for a subsequent filling cycle, and the filling nozzle is lifted clear of the filled cartridge unit 19 to permit index table 8 to move the next receptacle 56, with an empty cartridge unit 19 therein, beneath the filling nozzle. The sequence of pump piston and filling nozzle actuation is indicated schematically in FIG. 11. The sequence is repeated, including incremental rotation of index table 8, which results in the filled cartridge unit 19 approaching and entering Stopper Insertion Station No. 3, while an empty cartridge 19, previously inserted in next receptacle 56 of index table 8, at Loading Station No. 1, is moved to Filling Station No. 2.

*The Stopper Insertion Station No. 3*

Here again the actuating structure is generally similar to that described with respect to Loading Station No. 1 and Filling Station No. 2. Thus, as appears in FIGS. 1, 2 and 3, there is integral with a bracket member 74' (which is mounted on main support 11 by means of screws 228), a cylinder housing 240 comprising a pair of laterally extending bearing plate mounts 229 and 230, respectively provided with bearing hubs 231 and 232, in which are respectively retained bearing raceways 233 and 234 by means of closure plates 235 and 236. Extending through said raceways 233 and 234 are the ends of a shaft 237 to which is keyed the camming cylinder 14. The upper end 97 of shaft 237 is coupled to the shaft 93 associated therewith by means of coupling 95 as referred to hereinbefore. Camming cylinder 14 is provided with a pair of separately circumscribing channels 238 and 239 defining differing pathways for a purpose explained hereinafter.

Mounted on vertical wall 240' on cylinder housing 240, distally of the camming cylinder 14 by means of screws 241', is an open-ended housing 241 provided with a vertical bore 246. Mounted in bore 246 is a reciprocable hollow casing 247 of generally cylindrical configuration having affixed to the upper end thereof a closure plate 242. Closure plate 242 has a central bore 280 therethrough in which is slidably positioned with clearance a piston rod 281. To the lower end of piston rod 281 is affixed a piston follower 282 reciprocable in casing 247. The upper end of piston rod 281 (FIG. 3) has affixed thereto a nut and washer assembly 283 for retaining one end of a compression spring 284 telescoped on rod 281 with the other end abutting the upper surface of closure plate 242, whereby piston follower 282 is normally biased to the uppermost position in casing 247, which position is shown in the drawings.

The lower end of casing 247 is closed by a bottom closure plate 243 of solid construction having therethrough a vertically disposed bore 244, for a purpose which will appear hereinafter. Mounted on the right side of massive closure plate 243, as viewed in FIG. 7, is a horizontally disposed shaft 248 which has rotatably mounted at its distal end, a roller 252 which rides in channel 239 of cylinder 14. Slideably mounted within hollow cylinder 247 is a piston 279. Piston 279 has affixed to the right side at the lower end thereof, a second shaft 272 on which is rotatably supported a roller 273, which, in this case, rides in channel 238 of cylinder 14. Piston 279 has affixed thereto, at the bottom thereof, a piston rod 269 which reciprocates in bore 244 of massive closure plate 243 of the cylindrical casing 247.

The lowermost end of massive closure plate 243 is provided with a chamber 245 positioned axially of bore 244, and hence also of piston rod 269. Chamber 245 is dimensioned to accommodate one stopper or plunger 249 at a time which is destined for insertion into a filled cartridge, as will appear hereinafter. Feed conduit 17' opens into said chamber laterally thereof. Feed conduit 17' is dimensioned to permit passage laterally therethrough of stoppers 249 for the cartridge units 19. Said stoppers 249 comprise a main body 250 of resilient rubber, having a series of compressible ribs 251 circumferentially of said body 250 to provide a fluid-tight seal when the stopper is positioned in a cartridge unit 19. The top end of each stopper 249 has imbedded therein and protruding axially therefrom, a metal stud 253 which preferably is provided with a male-threaded surface to permit attachment thereto of a syringe plunger rod whereby reciprocal actuation of stopper or plunger 249 in cartridge unit 19 may be accomplished manually, when the device is to be used for injection or the like. The conduit 17' is connected to a source of stoppers 249. The source (not shown) may conveniently by a Syntron feeder, which as well known in the art, may function to feed the stoppers 249 seriatim into conduit 17' by vibratory action.

The lower end of chamber 245 is provided at its bottom with a funnel-shaped exit bore 254. The latter diminishes in diameter downwardly and communicates with a quill 255 having a bore 256 of a constant diameter which is appreciably less than the normal expand diameter of the stoppers 249 and substantially equal to that of bore 244 in massive closure plate 243 so that piston rod 269 may pass therethrough as described hereinafter. The outside diameter of quill 255 is selected to be less than the niside diameter dimension of the interior wall surface 271 of the cartridge units 19 to be handled by the apparatus of the invention, for a purpose described hereinafter.

Operatively associated with quill 255 is a positioning assembly 257. Positioning assembly 257 comprises an abutment plate 258 to which there is affixed a guide collar 259. Abutment plate 258 and collar 259 are provided with a continuous bore 260 by which positioning assembly 257 is reciprocally mounted on the exterior surface of quill 255. The lower end of bore 260 is provided with a beveled surface at 261 (FIG. 9A) of a contoured diameter to permit the receiving of the upper end 275 of a cartridge unit 10, as will appear hereinafter.

Positioning assembly 257 is further provided with guide means 262 comprising a pair of guide rods 263, 264 affixed to abutment plate 258 for movement therewith. Guide rods 263, 264 are respectively received in guide bores 265, 266 provided in the body of massive closure plate 243, as shown in phantom in FIG. 8. Compression springs 267, 268 are respectively telescoped on guide rods 263, 264, and function to bias abutment plate 258 to the lower position shown in FIG. 8.

In the operation of the Stopper Inserting Station No. 3, the camming channels 238 and 239 in camming cylinder 14 are selected to be of such correlative contours whereby the desired sequential operation at this Station is achieved. Thus, upon a filled cartridge unit 19 being positioned beneath quill 255 in said Station by intermittently rotative table 8, and after a stopper 249 has been supplied to chamber 245; casing 247 is caused to descend during the same period that piston 279 has started to descend. As a consequence, piston rod 269 forces the compressible stopper 249 from chamber 245 via the funnel shaped exit bore 254 and into the narrower bore 256 of quill 255, within which stopper 249 is laterally compressed to a minimum dimension. As casing 247 continues to descend, abutment plate 258 contacts the upper end 275 of cartridge unit 19 which is properly aligned with quill 255, by means of the guiding function of lower beveled end 261 of bore 260. Quill 255 is caused to continue its descent until its lowermost edge 267 is positioned at the liquid level 268 in cartridge unit 19. During said descent of quill 255 within cartridge unit 19, entrapped air is permitted to escape via the clearance afforded between the smaller-diametered exterior surface of quill 255 and the larger-diametered interior surface 271 of cartridge unit 19. With quill 255 maintained in the aforesaid position, piston rod 269 is caused to continued downwardly until the laterally compressed stopper 249 is also positioned so that its lowermost surface 270 is substantially at the liquid level 268 in cartridge unit 19. (FIG. 9B). Immediately thereafter, quill 255 is withdrawn upwardly as piston rod 269 maintains stopper 249 in the last described position with respect to liquid level 268 in cartridge unit 19 (FIG. 9C). Thus, stopper 249 is permitted to expand, due to its normal resilience, until its circumferential ribs 251 abut the interior wall surface 271 of cartridge unit 19 in fluid-tight relationship (cf. FIG. 9C again). Finally, the piston rod 269 is also withdrawn from cartridge unit 19, as is quill 255, back to the starting position shown in FIG. 9A, in readiness for another cycle of the stopper inserting operation just described, after another stopper 249 is fed to chamber 245 via conduit 17'.

The general relationship and sequence of the loading of quill 255 with a stopper 249 and the movement thereof, as well as of the piston rod or plunger 269, is indicated schematically in FIG. 11, opposite the legend "Station No. 3 Insertion of Stopper."

The Unloading Station No. 4

The essential elements of the unloading station have been described hereinbefore in that portion of the description under the heading "The Intermittently Rotatable Index Table" and may be referred to briefly at this point as comprising the laterally moveable retaining bracket 57 of which bifurcated stop member 58 is a part, and the mechanism for causing the reciprocation of said bracket. Said mechanism, as described under the aforesaid heading, comprises essentially the vertically disposed rod 60 on which bracket 57 is adjustably mounted by set screw 61, the horizontally slideable bar 62 to which rod 60 is affixed, guide member 63 for bar 62, cam roller wheel 65 affixed to bar 62, and the cam roller guideway channel 56 of sinous contour provided in the top periphery of the annular wall 67.

The sinuous contour of cam roller guideway 66 is such that, after a given receptacle 56 in index table 8 leaves Station No. 3 and is above a chute 69, roller 65 is drawn inwardly with slideable bar 62 on which is mounted, in the direction toward the center of index table 8. As a result, bifurcated support 58 is moved by rod 60 from beneath the shoulder 274 provided at the junction of the glass ampule 19', as best seen in FIGS. 9A–C and 10A–C. Cartridge unit 19 is thus free to fall from receptacle 56 in index table 8 by the action of gravity into chute 69 therebeneath and then to a point (not shown) for further handling, such as packaging. Here again, the general relationship of the holding and support-withdrawing function of bracket 57 at Station No. 4 is indicated schematically in FIG. 11 adjacent the appropriate legend.

The operation of the apparatus

Prior to operation of the apparatus, hopper 15 is loaded with a plurality of empty, sterile cartridge units 19, each furnished with its rubber cannula sheath 19''', to assure needle sterility and to seal what, during the filling and stoppering thereof by the apparatus, as described, will be the bottom of said unit. The cartridge units 19 are aligned in hopper 15 so that said covered cannula ends thereof are all directed to the left as viewed in FIG. 1. Similarly, the medicament reservoir (not shown) is filled with the medicament with which it is desired that the cartridge units 19 be filled, and the filling station cylinder is selected to provide the desired cartridge unit filling capacity and rate and extent of withdrawal of the feed nozzle. The feed source (not shown) for the stoppers 249 is also loaded. If desired, the lower end of chute 69 at Station No. 4 may be provided with a moving belt (not shown) to carry the filled and stoppered cartridge unit to a point for manual or mechanical packaging.

Prime mover 3 may then be energized by means (not shown) to cause rotation of shaft 35, and (via shaft 46, coupling 45, shaft 43, pinion 44 and gear 36), the driving of the intermittent drive means in gear box 23. Index table 8 is thus caused to rotate intermittently for moving one receptacle 56 at a time to each of Stations Nos. 1, 2, 3 and 4, seriatim, as described hereinbefore. Rotation of shaft 35, and with it, rotation of main drive shaft 48, also causes (via bevel gear 88 and respective pinions 91, shafts 90, pinions 92 and 92′, shafts 93, couplings 95 and shafts 97) rotation of the camming cylinders 12 and 14, as well as the camming cylinder (not shown) associated with the Filling Station No. 2. At the same time, eccentric mechanism 118–127, which is also driven by the gearing just described, actuates, via piston rod 117, 117′, the ejector mechanism 100–116 of hopper 15, whereby a single cartridge unit 19 at a time is moved horizontally into the cartridge holder 158. Thereafter, the loaded cartridge holder 158 is moved to the vertical position (shown in phantom in FIG. 4) so that it is over, and in alignment with, a receptacle 56 in intermittently rotatable index table 8, which at this time is synchronously stationary at "The Loading Station No. 1." With cartridge holder 158 and receptacle 56 in the stated alignment, loading plunger 169 is actuated by rack and pinion mechanism 170, 179, which, in turn, has been driven by camming action of the upper guideway 138 on roller 173. As a result, loading plunger 169 moves downwardly to urge the cartridge unit 19 in holder 158 in the same direction against the frictional grip of the fingers 160 of said holder and into receptacle 56, until the shoulder 274 of the cartridge unit 19 abuts the upper surfaces of the bifurcated support 57, which, at this time, is maintained therebeneath by its reciprocating mechanism referred to above.

The now loaded receptacle 56 moves to the next station, "The Filling Station No. 2," at which the feed nozzle (not shown) is lowered into the cartridge unit 19, the pump piston (not shown) is reciprocated to fill the cartridge unit 19 with medicament to a prescribed level, as the feed nozzle is withdrawn. After the filling operation and complete withdrawal of the feed nozzle from the cartridge unit 19, index table 8 moves the receptacle 56 with the medicament-filled cartridge unit 19 therein to the next station, "The Insertion of Stopper Station No. 3." Here, the rotatably driven cylinder 14 functions to lower quill 255 into the medicament-filled cartridge unit 19 until the lower edge of quill 255 is at the liquid level 268 in cartridge unit 19, with entrapped air escaping via the clearance provided between the tolerance-dimensioned exterior diameter of quill 255 and the interior diameter of cartridge unit 19. At the same time, plunger 269 forces a compressed stopper 249 downwardly through quill 255 until the bottom surface of the stopper is substantially in the plane of the lowermost edge of quill 255, and hence at liquid level 268. Thereafter, quill 255 is withdrawn to permit stopper 249 to expand within cartridge unit 19 while said stopper is maintained in position at the liquid level 268 by the now stationary plunger 269. Plunger 269 is then retracted to leave expanded stopper 249 frictionally engaged with the interior wall surface 271 of cartridge unit 19 in the desired position of said stopper at liquid level 268. Finally, index table 8 is moved to the next station, "The Unloading Station No. 4" at which supporting bracket 57 is withdrawn to permit the filled and stoppered cartridge unit 19 to fall into chute 69.

As referred to hereinbefore, the operative relationship of the various moveable elements at each of the four stations, throughout the same 360° cycle, may be as shown schematically in FIG. 11. As appears in FIG. 2, the respective circumferences of the entire apparatus and of the index table 8, may be so selected that a plurality of separate sets of Stations Nos. 1–4 may be positioned around said circumferences, which, as shown in FIG. 2, may have a complete set of said four stations in each quadrant of index table 8, thereby to permit additionally increased capacity for a single machine utilizing the concepts of the present invention.

It will, of course, be understoood that although a specific and preferred embodiment of the invention has been described above in detail, many changes and modifications may be made, and said invention embodied in widely different forms, without departing from the spirit and scope thereof, in its broadest aspects coming within the language or scope of any one or more of the appended claims. Merely by way of example, the actuating mechanism ejecting the cartridge units from hopper 15 at Station No. 1, may utilize a camming cylinder similar to those shown for the other stations. In like manner, the supporting bracket 57 at "The Unloading Station No. 4" may also be actuated by a camming cylinder. All or some of the camming guideways of the several stations may, in some instances, be consolidated on a single drum or cylinder. Other synchronously actuating mechanisms may be employed instead of those disclosed herein. Lost motion linkages or connections may be employed for one or more of the several pistons to minimize applied forces, as desired. Instead of gearing, belt and/or friction drives may be utilized where suitable. Other structural modifications having equivalent functions will additionally suggest themselves to those skilled in the art.

We claim:

1. A device for inserting a resilient compressible stopper provided with attachment means into an open-topped cartridge-syringe unit containing a liquid up to a predetermined level therein said device comprising: a generally cylindrical vertically disposed hollow guide means having a lower open end region, said hollow guide means, having at least in said region an internal diameter less than the external diameter of said resilient compressible stopper to be inserted, and said hollow guide means having at least in said region, an external diameter less than the internal diameter of said cartridge unit to be stoppered; introduction means for introducing one said resilient compressible stopper at a time into said guide means; ejection means for forcing said resilient compressible stopper, which has been introduced into said guide means, toward said lower open end of said guide means with said attachment means provided for said stopper facing upwardly; positioning means for positioning said open-topped cartridge unit containing liquid up to a predetermined level therein beneath said vertically disposed guide means and in axial alignment therewith, whereby the respective open ends of said guide means and said cartridge unit positioned therebeneath are opposed to each other; reciprocable means for causing axial movement of said guide means and said cartridge unit positioning means towards and away from each other; said reciprocable means being so dimensioned and arranged that, when said hollow guide means and said cartridge unit positioning means are in closest relationship to each other, said lower open end region of said hollow guide means is adjacent to said level of liquid in said cartridge unit and said stopper is positioned wholly within said cartridge unit at a point appreciably below the open top of said cartridge unit with said attachment means of said stopper facing upwardly and the lower surface of said stopper is in close proximity to said level of liquid in said cartridge unit, whereby reciprocable actuation of said stopper within said cartridge unit may be accomplished manually with the use of said attachment means.

2. A device for inserting a resilient compressible stopper into an open-topped cartridge-syringe unit containing a liquid, said device comprising: a generally cylindrical vertically disposed hollow guide means having a lower open end region, said hollow guide means having at least in said region, an internal diameter less than the external diameter of the resilient compressible stopper to be inserted, and said hollow guide means having at least in said region, an external diameter less than the internal diameter of the cartridge unit to be stoppered; introduction means for introducing one resilient compressible stopper at a time into said guide means; ejection means for forcing a resilient compressible stopper, which has been introduced into said guide means, toward said lower open end of said guide means; positioning means for positioning an open-topped cartridge unit containing liquid therein beneath said vertically disposed guide means and in axial alignment therewith, whereby the respective open ends of said guide means and the cartridge unit positioned therebeneath are opposed to each other reciprocable means for causing axial movement of said guide means and said cartridge unit positioning means towards and away from each other; synchronous driving means for said reciprocable means and said ejection means, said synchronous driving means being constructed and arranged so that said reciprocable means function to cause axial movement of said guide means and said cartridge unit toward each other after they have been aligned, whereby said guide means telescopically enter the open end of the cartridge unit, said reciprocable means further function to arrest said telescoping axial movement when said open end of said guide means is closely adjacent the level of liquid in the cartridge unit, and said reciprocable means function still further thereafter to cause relative axial movement of said guide means and said cartridge unit positioning means away from each other until said guide means and the cartridge unit in said positioning means are no longer telescoped; and said ejection means are synchronously actuated in said reciprocable means to position and then maintain a resilient compressible stopper at said lower open end of said guide means when said telescoping axial movement is arrested, and then to maintain the stopper in position at the liquid level in the cartridge unit as said guide means and the cartridge unit are moved away from each other, whereby the stopper is left in the cartridge unit just about the level of liquid therein.

3. A device for inserting a resilient compressible stopper into an open-topped cartridge-syringe unit containing a liquid, said device comprising: a housing; a moveable hollow casing mounted in said housing for vertical reciprocation therein; a piston in turn in said hollow casing for vertical reciprocation therein; a quill mounted at the lower end of said casing, said quill having an internal diameter substantially less than the external diameter of the resilient compressible stoppers to be handled by the device and an external diameter less than the internal diameter of the cartridge units into which the stoppers are to be inserted; a chamber at the upper end of said quill adapted to receive a resilient compressible stopper; a conduit opening into said chamber and adapted to feed one stopper at a time into said chamber; a piston rod mounted on said piston and extending downwardly therefrom; means for reciprocating said piston and with it said piston rod to cause reciprocation of the lowermost end of the latter between an upper position above said chamber to permit introduction of a resilient compressible stopper therein, and a lower position adjacent the lower end of said quill; and means for independently reciprocating said hollow casing in said housing.

4. A device for inserting a resilient compressible stopper into an open-topped cartridge-syringe unit containing a liquid, as claimed in claim 3, wherein means are provided for supporting a cartridge unit in axial alignment beneath said quill.

5. A device for inserting a resilient compressible stopper into an open-topped cartridge-syringe unit containing a liquid, as claimed in claim 4, wherein common driving means are provided for synchronously reciprocating said piston and said hollow casing.

6. A device for inserting a resilient compressible stopper into an open-topped cartridge-syringe unit containing a liquid, as claimed in claim 5, wherein said common driving means comprises a single camming cylinder having two separate contoured channelways in each of which rides a cooperative camming member, one of said camming members being attached to said piston for movement therewith and the other of said camming members being attached to said hollow casing for movement therewith.

7. A device for inserting a resilient compressible stopper into an open-topped cartridge-syringe unit containing a liquid, as claimed in claim 6, wherein the means for supporting the cartridge unit is alignment with said quill is moveable.

8. A device for inserting a resilient compressible stopper into an open-topped cartridge-syringe unit containing a liquid, as claimed in claim 6, wherein said means moveably mounting said support are provided on a rotatable index table and further comprise means for intermittent withdrawal thereof from support of the cartridge unit to permit falling away of the latter.

9. A device for inserting a resilient compressible stopper into an open-topped cartridge-syringe unit containing a liquid, as claimed in claim 8, wherein said means moveably mounting said support also comprise manually adjustable means for varying the vertical disposition of said support with respect to said index table.

10. The method of inserting a resilient compressible stopper provided with attachment means into an open-topped cartridge-syringe unit, which method comprises: positioning an open-topped cartridge unit containing a liquid up to a predetermined level therein, in vertical disposition; providing a resilient compressible stopper having attachment means and a diameter normally adapted to fit snugly within said cartridge unit; compressing said stopper radially to a diameter that is less than the internal diameter of said cartridge unit; inserting the compressed stopper downwardly into the open top of said cartridge unit with said attachment means facing upwardly, while permitting ambient gaseous fluid in the unit above the level of liquid therein to escape upwardly; containing the downward insertion of said compressed stopper, while still permitting escape of gaseous fluid in the cartridge unit from above the liquid level therein, until said stopper is positioned closely adjacent the liquid level in said cartridge unit, and wholly within the latter; and then permitting the so-positioned radially compressed stopper to expand toward its normal diameter, whereby said stopper fits snugly in said cartridge unit closely adjacent the liquid level in said unit and below the open top thereof with said attachment means of said stopper facing upwardly, whereby reciprocable actuation of said stopper within said cartridge unit may be accomplished manually with the use of said attachment means.

References Cited
UNITED STATES PATENTS

| 527,021 | 10/1894 | Norton | 53—322 |
| 882,663 | 3/1908 | Barthold | 53—322 |

TRAVIS S. McGEHEE, *Primary Examiner.*

R. L. SPRUILL, *Assistant Examiner.*

PO-1050
(5/69)

UNITED STATES PATENT OFFICE
CERTIFICATE OF CORRECTION

Patent No. 3,391,518          Dated July 9, 1968

Inventor(s) William A. Gettig and Joseph H. Gettig

It is certified that error appears in the above-identified patent and that said Letters Patent are hereby corrected as shown below:

Column 3, line 70, for "units" read --unit; column 6, line 62, for "Insertion" read --Inserting--; column 7, line 33, for "dispoistion" read --disposition--; column 11, line 70, for "or" read --of--; column 13, line 22, for "expand" read --expanded--; again in column 13, line 27, for "niside" read --inside--; column 14, line 38, for "sinous" read --sinuous--; column 18, line 46, for "containing" read --continuing--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents